(12) United States Patent
Ruschmann et al.

(10) Patent No.: US 6,883,997 B1
(45) Date of Patent: Apr. 26, 2005

(54) DEVICE FOR CONNECTING A SHAFT TO A RING

(75) Inventors: Gustav Ruschmann, Renchen (DE); Matthias Noelter, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 09/889,345

(22) PCT Filed: Nov. 9, 2000

(86) PCT No.: PCT/DE00/03913

§ 371 (c)(1),
(2), (4) Date: Feb. 26, 2002

(87) PCT Pub. No.: WO01/36856

PCT Pub. Date: May 25, 2001

(30) Foreign Application Priority Data

Nov. 16, 1999 (DE) .................. 199 54 969

(51) Int. Cl.[7] .............................................. F16B 9/00
(52) U.S. Cl. ........................ 403/279; 403/283; 29/432; 29/525
(58) Field of Search ..................... 403/1, 274, 279, 403/280, 283, 289, 359.1, 359.6; 29/432, 29/525

(56) References Cited

U.S. PATENT DOCUMENTS

| | | | |
|---|---|---|---|
| 3,872,578 A * | 3/1975 | Ullom | 29/525 |
| 4,089,612 A * | 5/1978 | Mazzeo | 403/361 |
| 4,249,298 A * | 2/1981 | Kanamaru et al. | 29/520 |
| 4,376,333 A * | 3/1983 | Kanamaru et al. | 29/525 |
| 4,377,762 A * | 3/1983 | Tatsumi et al. | 29/525 |
| 4,438,555 A * | 3/1984 | Tsumuki et al. | 29/505 |
| 4,574,448 A | 3/1986 | Brandenstein et al. | 29/283.5 |
| 4,620,454 A * | 11/1986 | Sugiuchi et al. | 74/567 |
| 4,781,075 A * | 11/1988 | Yamaji et al. | 74/567 |
| 4,886,392 A * | 12/1989 | Iio | 29/525 |
| 5,084,963 A * | 2/1992 | Murray et al. | 403/283 |
| 5,348,210 A * | 9/1994 | Linzell | 29/525 |
| 6,099,195 A * | 8/2000 | Egner-Walter | 403/282 |
| 6,428,236 B1 * | 8/2002 | Aota et al. | 403/359.5 |
| 2002/0041790 A1 * | 4/2002 | Suzuki et al. | |

FOREIGN PATENT DOCUMENTS

| | | | |
|---|---|---|---|
| EP | 0 088 816 A | | 9/1983 |
| FR | 806 791 A | | 12/1936 |
| GB | 1 537 800 A | | 1/1979 |
| JP | 355094740 A | * | 7/1980 |
| JP | 404277321 A | * | 10/1992 |
| JP | 405010340 A | * | 1/1993 |
| JP | 406200951 A | * | 7/1994 |
| JP | 406221333 A | * | 8/1994 |

* cited by examiner

Primary Examiner—Robert J. Sandy
Assistant Examiner—Ruth C. Rodriguez
(74) Attorney, Agent, or Firm—Michael J. Striker

(57) ABSTRACT

A device for connecting a shaft (10), in particular a worm shaft, to a ring (12), in particular a ring magnet, which has an inside face (14) that is in contact with an outside face (16) of the shaft (10). It is proposed that on the outside face (16) of the shaft (10), there are deformation regions (18), by means of which a nonpositive-engagement, rotationally fixed connection of the ring (12) to the shaft (10) is assured.

11 Claims, 2 Drawing Sheets

DEVICE FOR CONNECTING A SHAFT TO A RING

PRIOR ART

Figure 1:
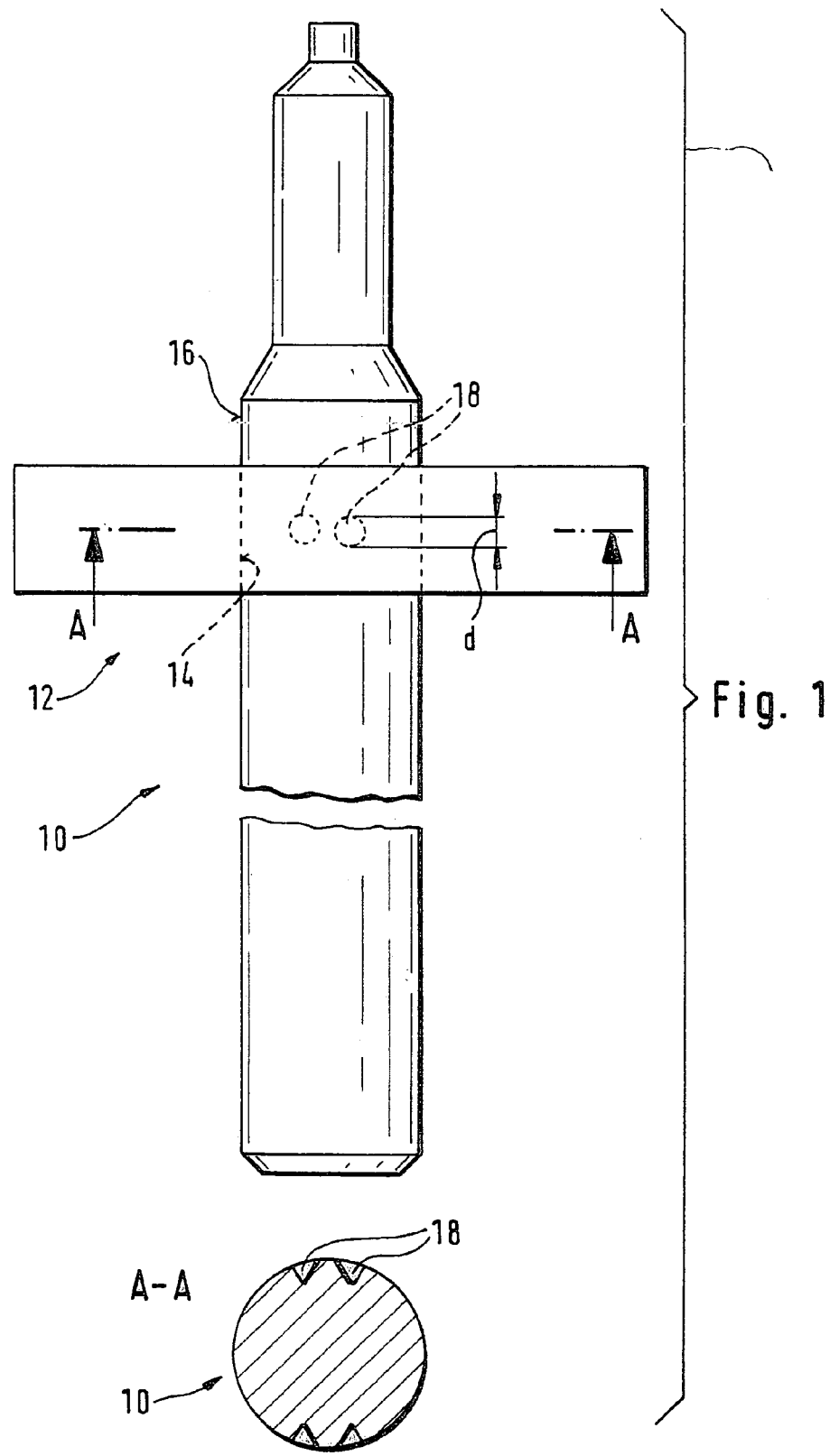

The invention relates to a device for connecting a shaft, in particular a worm shaft, to a ring, in particular a ring magnet, as generically defined by the preamble to the main claim.

Various techniques for connecting a ring to a shaft by nonpositive engagement in a rotationally fixed manner are known. One current method is to secure and fix the ring to the shaft with adhesive, but its metering and manipulation is very complicated and involves high maintenance and repair costs. Moreover, there is the risk that the connection will come undone because of aging processes.

Another known technique is, after the mounting of the ring, to calk the shaft afterward and in this way to securely fix the ring. In the process, however, it can happen that the already fully mounted ring will suffer damage and in the worst case be destroyed.

ADVANTAGES OF THE INVENTION

The device according to the invention for connecting a shaft, in particular a worm shaft, to a ring, in particular a ring magnet, having the characteristics of the main claim has the advantage that mounting the ring is accomplished substantially more easily, securely and effectively in comparison to the known connecting devices. This is achieved by means of deformation regions, which are present on the outside face of the shaft that is in contact with the inside face of the ring and that are already applied to the shaft before the ring is actually mounted.

Another advantage is that adhesives that are environmentally harmful, for instance, can be omitted in the assembly process. As a result, the corresponding mounting devices require much less maintenance.

A very great advantage is also considered to be that armature imbalances caused by uneven distributions of adhesive are already avoided from the outset.

In comparison to the later calking of the shaft, the application according to the invention of the deformation regions before the actual mounting of the ring or ring magnet has the advantage of very greatly reducing the risk of breakage or destruction of the ring magnet.

By the provisions recited in the dependent claims, advantageous refinements of the device defined by the main claim are possible.

For instance, it is extremely advantageous if the deformation regions are distributed regularly in the radial direction over the outside face of the shaft. This guarantees an optimal hold of the ring on the shaft and distributes the load continuously over the ring.

It has proved especially advantageous if the deformation regions are formed by at least two impressed features. These impressed features can be pressed, with an impressing die, into the outside face of the shaft that is to be brought into contact with the inside face of the ring. In the process, the shaft radius increases at the edges of these impressed features, and thus once the ring is mounted on the shaft, a rotationally fixed, nonpositive connection between the ring and the shaft is assured.

Especially suitable deformation of the shaft material is attained if the impressed features have a conical shape. It is especially advantageous if the cone of the impressed features is between 50° and 70°, and preferably is 60°. Advantageously, the maximum diameter of the impressed features is between 1.5 mm and 2.4 mm, and preferably is 1.9 mm. With these measurements, the best results can be attained with regard to the nonpositive engagement or rotational fixation of the ring to the shaft.

With regard to the disposition of the impressed features, pairs of impressed features located side by side have proved to be especially advantageous. If these double impressed features are moreover offset by 180° from one another, then an optimal security against torsion and displacement of the ring on the shaft is attained.

Advantageously, the deformation regions are disposed approximately centrally in the axial direction to the inside face. A further advantage is obtained whenever in addition to the impressed features, radially extending indentations are present on the outside face of the shaft. The security of the ring against displacement in the axial direction is thus reinforced.

The shape of the impressed features is naturally not limited to the conical shape. Still other shapes are conceivable, such as impressed features in the shape of notches. What is important is only that there be the simplest and securest possible connection of the ring to the shaft.

DRAWING

In the drawing, two exemplary embodiments of a device of the invention are shown, and they are explained in further detail in the ensuing description.

Shown are

Figure 2:
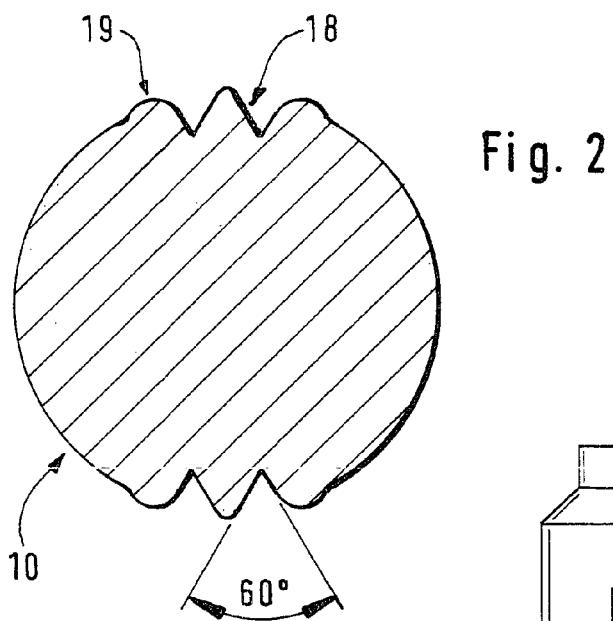

FIG. 1, schematically, a device according to the invention in the first exemplary embodiment, and a section taken along the line A—A;

FIG. 2, an enlarged view of the section; and

Figure 3:
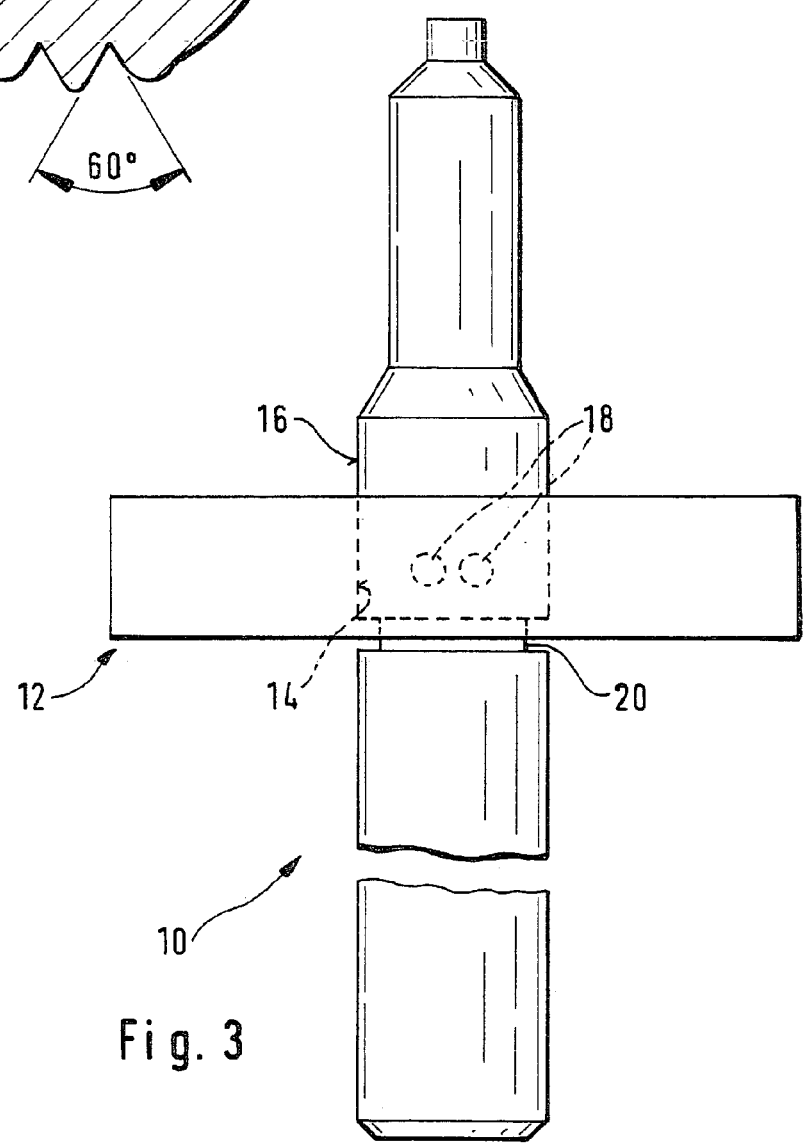

FIG. 3, a second exemplary embodiment.

DESCRIPTION

The first exemplary embodiment, shown in FIG. 1, of a device of the invention has a shaft 10, with an outside face 16, as well as a ring 12, with an inside face 14. Two double impressed features, each with a conical shape, are embodied on the outside face 16 of the shaft 10. In the section taken along the line A—A, it is clearly seen that the two double impressed features are offset by 180° from one another.

The cone of the respective impressed features is 60°, while its diameter d is 1.9 mm.

The double impressed features 18 are made by machine on the shaft using an impressing die during the production process. The impressing process causes a deformation of the shaft material, and regions that have a greater shaft radius than the remainder of the shaft form.

The deformation regions are shown in an enlarged view in FIG. 2, in which the protrusions 19 formed as a result of the impressing operation are shown with an exaggerated height. It can be seen clearly that the material of the shaft becomes deformed especially in the region of the edges of the impressed features 18.

In the second exemplary embodiment shown in FIG. 3, in which the same characteristics are identified by the same reference numerals, in addition to the conical double impressed features 18 there is an indentation 20 extending radially around the shaft 10. This indentation 20 can be utilized to assure an additional hold in the axial direction, for instance by injecting adhesive into the indentation.

What is claimed is:

1. A device for connecting a shaft (10), in particular, a worm shaft, with a ring magnet, wherein said ring magnet has an inside face (14) that is in contact with an outside face (16) of the shaft (10), wherein on the outside face (16) of the shaft (10), there are deformation regions (18), by means of which a force-locking engagement, rotationally fixed connection of the ring (12) to the shaft (10) is assured, wherein the deformation regions (18) are impressed by means of at least two impressed features by means of an impressing die into the outside face of the shaft that is to be brought into contact with the inside face of the ring before mounting of the ring, wherein the deformation regions (18) are arranged approximately centrally in an axial direction on the outer face of the shaft in a region of the inner face of the mounted ring, wherein axial dimensions of the deformation regions (18) are smaller than an axial dimension of the inner surface (14) of the ring magnet, and wherein a radius of the shaft increases at the edges of the at least two-impressed features.

2. The device of claim 1, wherein the deformation regions (18) are distributed regularly in the radial direction over the outside face (16) of the shaft (10).

3. The device of claim 1, wherein the impressed features (18) have a conical shape.

4. The device of claim 3, wherein the cone of the impressed features (18) is between 50° and 70.

5. The device of claim 4, wherein the cone of the impressed features (18) is 60°.

6. The device of claim 3, wherein the maximum diameter of the impressed features (18) is between 1.5 mm and 2.4 mm.

7. The device of claim 6, wherein the maximum diameter of the impressed features (18) is 1.9 mm.

8. The device of claim 1, wherein two of the impressed features (18) at a time are disposed in pairs.

9. The device of claim 1, wherein the impressed features (18) are offset by 180° from one another.

10. The device of claim 1, wherein in addition to the impressed features (18), radially extending indentations (20) are present on the outside face (16) of the shaft (10).

11. A device for connecting a shaft (10), in particular, a worm shaft, with a ring magnet, wherein said ring magnet has an inside face (14) that is in contact with an outside face (16) of the shaft (10), wherein on the outside face (16) of the shaft (10), there are deformation regions (18), by means of which a force-locking engagement, rotationally fixed connection of the ring (12) to the shaft (10) is assured, wherein the deformation regions (18) are impressed by means of at least two impressed features by means of an impressing die into the outside face of the shaft that is to be brought into contact with the inside face of the ring before mounting of the ring, wherein the deformation regions (18) are arranged approximately centrally in an axial direction on the outer face of the shaft in a region of the inner face of the mounted ring, wherein the at least two impressed features (18) have a conical shape with round surfaces perpendicular to an impression direction, wherein the shaft has a conical recess corresponding to the conical deformation regions, thereby providing a round bead on a ring-shaped edge of the deformation regions.

* * * * *